(12) United States Patent
Ayabe et al.

(10) Patent No.: US 7,740,559 B2
(45) Date of Patent: Jun. 22, 2010

(54) SHIFT CONTROL DEVICE OF VEHICULAR AUTOMATIC TRANSMISSION

(75) Inventors: Atsushi Ayabe, Nagoya (JP); Toshio Sugimura, Nagoya (JP); Takahiko Tsutsumi, Toyota (JP); Hisashi Ishihara, Toyoake (JP); Kazuhiro Iketomi, Nagoya (JP); Yosuke Takaie, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 653 days.

(21) Appl. No.: 11/602,219

(22) Filed: Nov. 21, 2006

(65) Prior Publication Data

US 2007/0117677 A1 May 24, 2007

(30) Foreign Application Priority Data

Nov. 22, 2005 (JP) .............................. 2005-337451

(51) Int. Cl.
*F16H 59/74* (2006.01)

(52) U.S. Cl. ..................................... 477/102

(58) Field of Classification Search ........................ None
See application file for complete search history.

(56) References Cited

U.S. PATENT DOCUMENTS

| | | | | |
|---|---|---|---|---|
| 6,334,082 | B1 * | 12/2001 | Jeon ............................. | 701/55 |
| 6,346,063 | B1 * | 2/2002 | Kondo et al. ................. | 477/143 |
| 6,712,735 | B2 * | 3/2004 | Hayabuchi et al. ............ | 477/68 |
| 7,115,065 | B2 * | 10/2006 | Tabata et al. ................... | 477/3 |
| 7,220,213 | B2 * | 5/2007 | Shimada et al. ............... | 477/73 |
| 7,247,126 | B2 * | 7/2007 | Shim et al. .................. | 477/148 |
| 7,347,805 | B2 * | 3/2008 | Iriyama et al. ............. | 477/102 |
| 2004/0063540 | A1 * | 4/2004 | Kondo et al. ................ | 477/102 |
| 2005/0239597 | A1 * | 10/2005 | Shimada ..................... | 477/107 |

FOREIGN PATENT DOCUMENTS

| | | | |
|---|---|---|---|
| DE | 10 2004 059 414 A1 | | 7/2005 |
| JP | 8-244499 A | | 9/1996 |
| JP | 9-21337 A | | 1/1997 |
| JP | 10131778 A | | 5/1998 |
| JP | 2004-316575 A | | 11/2004 |
| KR | 10-0256741 B1 | | 2/2000 |

* cited by examiner

*Primary Examiner*—David D Le
*Assistant Examiner*—Justin Holmes
(74) *Attorney, Agent, or Firm*—Sughrue Mion, PLLC

(57) ABSTRACT

A shift control device of a vehicular automatic transmission, if during a first shift in a power-off state, a second shift judgment for a second shift that is a power-on downshift is made, performs a second shift control of lowering an input shaft rotation speed to a synchronous rotation speed of a post-second shift gear step through an engagement control of the friction engagement devices, and when the second shift is performed, performs a control of reducing a throttle valve opening degree of the engine to a predetermined degree that causes the engine to output a torque that is able to bring the input shaft rotation speed to a rotation speed that is higher than the synchronous rotation speed of the post-second shift gear step. The control device also executes a retardation control of retarding an ignition timing of the engine when the input shaft rotation speed is dropped through the second shift control.

8 Claims, 12 Drawing Sheets

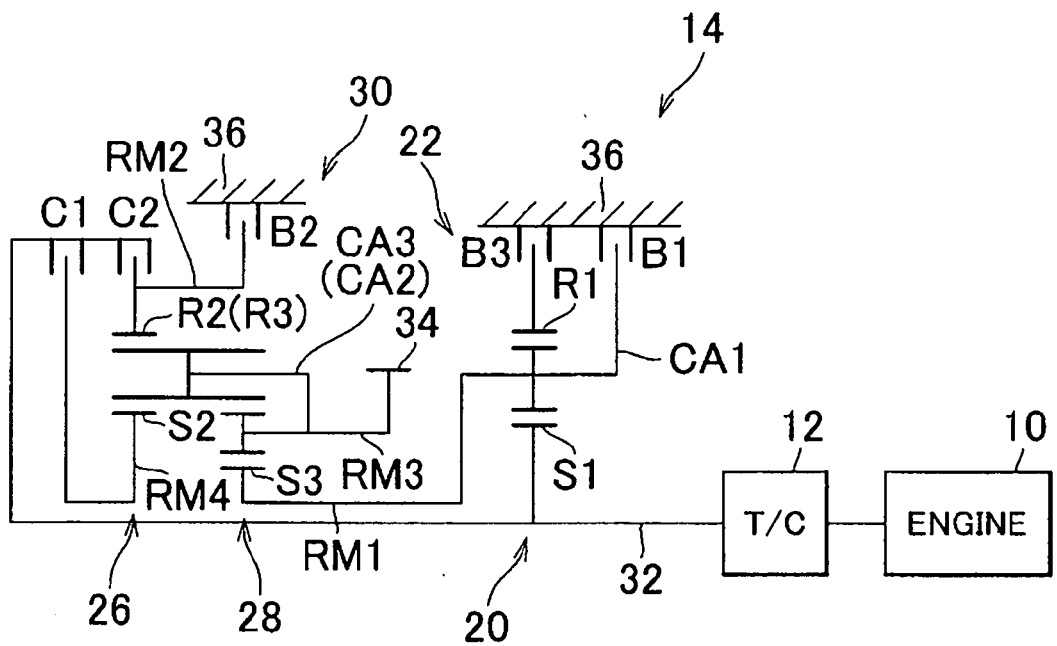

SHIFT CONTROL DEVICE OF VEHICULAR AUTOMATIC TRANSMISSION

INCORPORATION BY REFERENCE

The disclosure of Japanese Patent Applications No. 2005-337451 filed on Nov. 22, 2005, including the specification, drawings and abstract, is incorporated herein by reference in its entirety.

BACKGROUND OF THE INVENTION

1. Field of the Invention

The invention relates to an improvement in a shift control device of a vehicular automatic transmission that performs a second shift control by lowering the input shaft rotation speed through the engagement control of a friction engagement device in the case where during a first shift in a power-off state, a second shift judgment for a power-on downshift is made.

2. Description of the Related Art

There is a known vehicular automatic transmission that establishes a plurality of gear steps of different speed change ratios by selectively engaging a plurality of friction engagement devices and accordingly changes in speed the rotation transferred from the engine to the input shaft and outputs the speed-changed rotation. An example of such a device is described in Japanese Patent Application Laid-Open Publication No. HEI 8-244499, in which if during a first shift in a power-off state, a second shift judgment for a power-on downshift is made, a second shift control of engaging and disengaging friction engagement devices is performed to execute the second shift, and at the same time, the sharp rise of the rotation of the input shaft is prevented by reducing the torque of the engine through a throttle control, or an ignition timing retardation control, or the like. Incidentally, an ordinary single power-on downshift is performed by gradually releasing a release-side friction engagement device and gradually increasing the input shaft rotation speed. At the time of a multiplex shift caused by a power-off→on operation, however, the release-side friction engagement device is immediately released, and the shift is performed through the engagement control of the engagement-side friction engagement device.

Generally, in the power-on downshift, the input shaft rotation speed is once let to sharply rise to or above the synchronous rotation speed of the post-shift gear step, and the input shaft rotation speed in an upward tendency is lowered to the synchronous rotation speed to finish the shift. Therefore, while the aforementioned reduction of the engine torque is performed, the throttle valve opening degree or the like needs to be controlled to such an extent that the input shaft rotation speed sharply rises to or above the synchronous rotation speed. Therefore, there is a problem of a shift shock occurring as a large peak in the output shaft torque arises from inertia torque when the sharply raised input shaft rotation speed is lowered by the engagement of a friction engagement device.

SUMMARY OF THE INVENTION

The invention has been accomplished against the background of the aforementioned circumstances, and provides a vehicular automatic transmission that restrains the occurrence of a large peak in the output shaft torque due to inertia torque when the input shaft rotation speed is lowered by the engagement control of a friction engagement device in the case where during a first shift in the power-off state, a second shift judgment for a power-on downshift is made.

Accordingly, there is provided a shift control device of a vehicular automatic transmission that establishes a plurality of gear steps of different speed change ratios by selectively engaging a plurality of friction engagement devices, and speed-changes rotation transferred from an engine to an input shaft, and outputs speed-changed rotation. This shift control device of the vehicular automatic transmission including:

a first controller that, if during a first shift in a power-off state, a second shift judgment for a second shift that is a power-on downshift is made, performs a second shift control of lowering an input shaft rotation speed to a synchronous rotation speed of a post-second shift gear step through an engagement control of the friction engagement devices in order to execute the second shift; and a second controller that, when the second shift is performed, performs a control of reducing a throttle valve opening degree of the engine to a predetermined degree of opening that causes the engine to output a torque that is able to bring the input shaft rotation speed of the input shaft to a rotation speed that is higher than the synchronous rotation speed of the post-second shift gear step, and that executes a retardation control of retarding an ignition timing of the engine when the input shaft rotation speed is dropped through the second shift control.

In the shift control device of the vehicular automatic transmission, when during the first shift in a power-off state, the second shift that is a power-on downshift is performed, the control of reducing the throttle valve opening degree of the engine to a predetermined degree of opening that causes the output of a torque that can bring the rotation speed of the input shaft to a rotation speed that is higher than the synchronous rotation speed of the post-second shift gear step is performed. Therefore, it is possible to prevent excessive sharp rise in the rotation speed while allowing the input shaft rotation speed to reach a rotation speed that is higher than the synchronous rotation speed of the post-second shift gear step. On the other hand, when the second shift control is performed so that the input shaft rotation speed is lowered to the synchronous rotation speed of the post-second shift gear step through the engagement control of the friction engagement device, the engine torque is dropped through the retardation control of the ignition timing of the engine. Therefore, the peak in the output shaft torque caused by the inertia torque of the engine and the like is reduced and the shift shock is restrained.

The invention relates to an engine-driven vehicle that generates driving power by the combustion of fuel, and includes an electronic throttle valve that allows an electronic control of the throttle valve opening degree, and an ignition device that allows a retardation control of the ignition timing.

Examples of the automatic transmission used in the invention include various automatic transmissions that establish a plurality of gear steps in accordance with the states of actuation of a plurality of clutches and brakes, such as automatic transmissions of a planetary gear type, a parallel-axes type, etc. The input shaft of the automatic transmission, for example, in the case where the motive power is transferred thereto from the engine via a torque converter, is a turbine shaft of the torque converter.

As for the friction engagement devices, hydraulic type devices are suitably used. The engagement pressure is changed in a predetermined change pattern by, for example, a hydraulic control using solenoid valves or the like, or the operation of an accumulator, etc. However, other types of friction engagement devices, such as electromagnetic type devices and the like, may also be used. These friction engagement devices are, for example, single-plate type or multi-plate type clutches and brakes that are engaged by actuators, such as hydraulic cylinders and the like, as well as belt-type brakes, etc. Besides, direct pressure control in which the output oil pressure of a large-capacity solenoid (linear solenoid valve, or the like) is directly supplied and friction engagement devices are engaged by the output oil pressure is suitably adopted. However, it is also possible that the hydraulic control may be performed via control valves and the like whose pressure is regulated by the output oil pressure.

The first shift in the power-off state is a shift performed in an accelerator-off state where the accelerator is not operated, and may be either an upshift or a downshift. The invention includes two kinds of multiplex shifts, that is, the case where, during the first shift that is a power-off upshift, the second shift judgment for a power-on downshift is made due to an accelerator operation (output requirement operation), and the case where, during the first shift that is a power-off downshift, the second shift judgment for a power-on downshift is made due to an accelerator operation. In either case, the second shift that is a power-on downshift is caused to progress generally by immediately releasing the release-side friction engagement device, and by lowering the input shaft rotation speed through the engagement control of the engagement-side friction engagement device.

The throttle valve opening degree that causes the engine to output a torque that is able to bring the rotation speed of the input shaft to a rotation speed that is higher than the synchronous rotation speed may be determined beforehand at a constant value, or may also be calculated from a computing equation, a data map, etc. that is determined by using as parameters the kind of shift, the states of the vehicle, such as the working oil temperature or the like, the states of driving the vehicle, etc.

As for the retardation control of the ignition timing, it is appropriate, for example, to retard the timing straightaway to the maximum value of the amount of retardation. However, it is also appropriate to retard the timing merely to a predetermined intermediate amount of retardation, or it is also possible to continuously change the amount of retardation.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 1 is a skeleton diagram of a vehicular drive apparatus to which the invention is applied;

FIG. 2 is a diagram illustrating the engaged and released states of clutches and brakes for establishing various gear steps of an automatic transmission shown in FIG. 1;

DETAILED DESCRIPTION OF THE PREFERRED EMBODIMENTS

Figure 3:
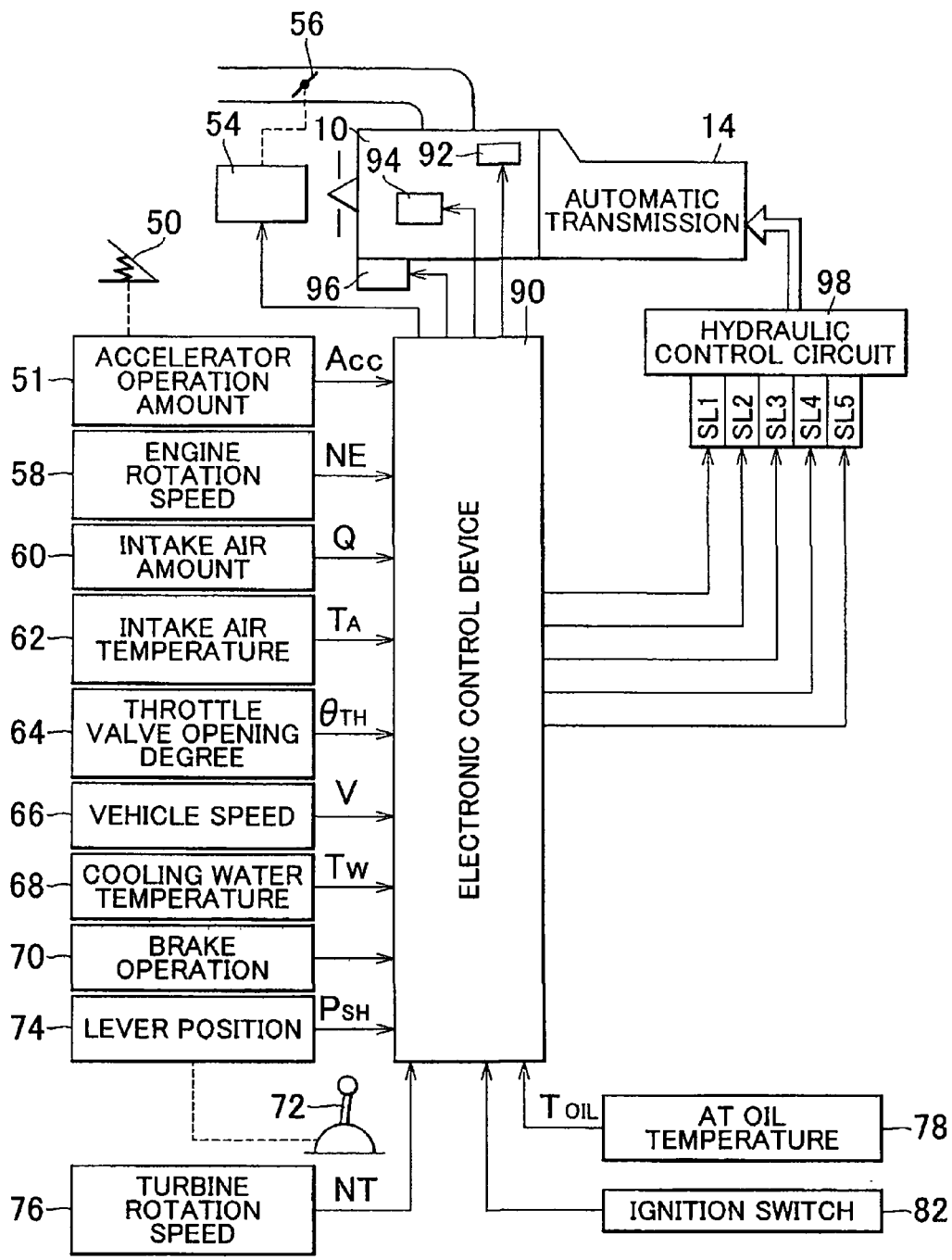
FIG. 3 is a diagram illustrating input/output signals with respect to an electronic control device provided in a vehicle of the embodiment shown in FIG. 1.

In the following description and the accompanying drawings, the present invention will be described in more detail with reference to exemplary embodiments.

FIG. 1 is a skeleton diagram of a transversely mounted type vehicular drive apparatus, such as an FF (front engine, front wheel drive) vehicle or the like, in which the output of an engine 10 constructed of an internal combustion engine, such as a gasoline engine or the like, is transferred to driving wheels (front wheels) via a torque converter 12, an automatic transmission 14, and a differential gear device (not shown). The engine 10 is a power source for running the vehicle, and the torque converter 12 is a coupling that employs a fluid.

The automatic transmission 14 has, on the same axis, a first speed change portion 22 constructed mainly of a single pinion-type first planetary gear device 20, and a second speed change portion 30 constructed mainly of a single pinion-type second planetary gear device 26 and a double pinion-type third planetary gear device 28. The automatic transmission 14 changes the rotation of an input shaft 32 in speed, and outputs it from an output gear 34. The input shaft 32 corresponds to an input member, and, in this embodiment, is a turbine shaft of a torque converter 12. The output gear 34 corresponds to an output member, and rotationally drives the left and right driving wheels via the differential gear device. Incidentally, the automatic transmission 14 is constructed substantially symmetrically about a center line. In FIG. 1, a half of the automatic transmission 14 below the center line is omitted.

The first planetary gear device 20 constituting the first speed change portion 22 has three rotating elements: a sun gear S1, a carrier CA1, and a ring gear R1. The sun gear S1 is coupled to the input shaft 32, and is rotationally driven thereby, and the ring gear R1 is unrotatably fixed to a case 36 via a third brake B3. In this manner, the carrier CA1 is rotated as an intermediate output member at reduced speed relative to the input shaft 32, and thus outputs reduced-speed rotation. The second planetary gear device 26 and the third planetary gear device 28 constituting the second speed change portion 30 are partly coupled to each other, and therefore have four rotating elements RM1 to RM4. Concretely, a sun gear S3 of the third planetary gear device 28 constitutes a first rotating element RM1. A ring gear R2 of the second planetary gear device 26 and a ring gear R3 of the third planetary gear device 28 are coupled to each other, and constitute a second rotating element RM2. A carrier CA2 of the second planetary gear device 26 and a carrier CA3 of the third planetary gear device 28 are coupled to each other, and constitute a third rotating element RM3. A sun gear S2 of the second planetary gear device 26 constitutes a fourth rotating element RM4. The second planetary gear device 26 and the third planetary gear device 28 are provided as a Ravigneaux type planetary gear train in which the carriers CA2 and CA3 are constructed by a common member, and the ring gears R2 and R3 are constructed by a common member, and pinion gears of the second planetary gear device 26 serve also as second pinion gears of the third planetary gear device 28.

The first rotating element RM1 (sun gear S3) is selectively coupled to the case 36 and therefore is stopped from rotating by a first brake B1. The second rotating element RM2 (ring gear R2, R3) is selectively coupled to the case 36 and therefore is stopped from rotating by a second brake B2. The fourth rotating element RM4 (sun gear S2) is selectively coupled to the input shaft 32 via a first clutch C1. The second rotating element RM2 (ring gear R2, R3) is selectively coupled to the input shaft 32 via a second clutch C2. The first rotating element RM1 (sun gear S3) is integrally coupled to the carrier CA1 of the first planetary gear device 20 which is the intermediate output member, and the third rotating element RM3 (carrier CA2, CA3) is integrally coupled to the output gear 34. In this manner, rotation is output from the output gear 34.

Each of the clutches C1, C2 and the brakes B1, B2, B3 (hereinafter, referred to simply as "clutch C" or "brake B" if not particularly distinguished) is a hydraulic friction engagement device, such as a multi-plate clutch, a band brake, etc., whose engagement is controlled by a hydraulic actuator. The clutches C1, C2 and the brakes B1, B2, B3 are switched between the engaged and released states as shown in FIG. 2 by a hydraulic circuit being switched through the excitation and deexcitation of linear solenoid valves SL1 to SL5 of a hydraulic control circuit 98 (see FIG. 3) or through the use of a manual valve (not shown). Thus, each of gear steps, that is, six forward-travel steps and one reverse-travel step, can be established in accordance with the operation position of a shift lever 72 (see FIG. 3). In FIG. 2, "1st" to "6th" mean the first to sixth speed forward-travel gear steps, and "Rev" means a reverse-travel gear step. The speed change ratios thereof (=input rotation speed NIN/output shaft rotation speed NOUT) are appropriately determined by the gear ratios ρ1, ρ2, ρ3 of the first planetary gear device 20, the second planetary gear device 26 and the third planetary gear device 28. In FIG. 2, "O" means engagement, and blanks mean release.

Figure 4:
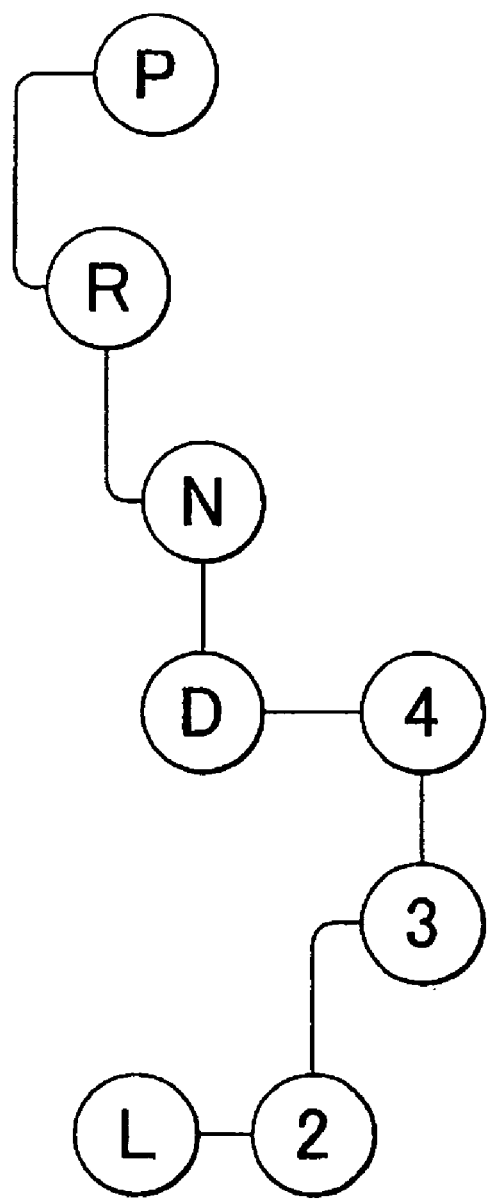
FIG. 4 is a diagram showing an example of a shift pattern of a shift lever shown in FIG. 3.

The shift lever 72 is designed to be operated, for example, to the parking position "P", the reverse drive position "R", the neutral position "N", and the forward drive positions "D", "4", "3", "2", "L" in accordance with the shift pattern shown in FIG. 4. At the "P" and "N" positions, a neutral state where the power transfer is cut off is established. However, at the "P" position, rotation of the driving wheels is mechanically prevented by a mechanical parking mechanism (not shown).

FIG. 3 is a block diagram illustrating a control system that is provided in a vehicle for controlling the engine 10 and the automatic transmission 14 shown in FIG. 1, and the like. In this control system, the amount of operation of an accelerator pedal 50 (accelerator operation amount) Acc is detected by an accelerator operation amount sensor 51. The accelerator pedal 50 is depressed to extents that are in accordance with the driver's output requirements. The accelerator pedal 50 corresponds to an accelerator-operating member, and the accelerator operation amount Acc corresponds to the output requirement. An intake piping of the engine 10 is provided with an electronic throttle valve 56 whose degree of opening $\theta_{TH}$ is changed by a throttle actuator 54. Further provided are an engine rotation speed sensor 58 for detecting the rotation speed NE of the engine 10, an intake air amount sensor 60 for detecting the intake air amount Q of the engine 10, an intake air temperature sensor 62 for detecting the temperature TA of intake air, an idle switch-equipped throttle sensor 64 for detecting the fully closed state (idle state) of the electronic throttle valve 56 and the degree of opening $\theta_{TH}$ thereof, a vehicle speed sensor 66 for detecting the rotation speed of the output gear 34 (corresponding to the output shaft rotation speed) NOUT that corresponds to the vehicle speed V, a cooling water temperature sensor 68 for detecting the cooling water temperature TW of the engine 10, a brake switch 70 for detecting the presence/absence of foot brake operation, a lever position sensor 74 for detecting the lever position (operation position) PSH of the shift lever 72, a turbine rotation speed sensor 76 for detecting the turbine rotation speed NT, an AT oil temperature sensor 78 for detecting the AT oil temperature TOIL that is the temperature of the working oil within the hydraulic control circuit 98, an ignition switch 82, etc. From these sensors, signals representing the engine rotation speed NE, the intake air amount Q, the intake air temperature TA, the throttle valve opening degree $\theta_{TH}$, the vehicle speed V (output shaft rotation speed NOUT), the engine cooling water temperature TW, the presence/absence of brake operation, the lever position PSH of the shift lever 72, the turbine rotation speed NT, the AT oil temperature TOIL, the operation position of the ignition switch 82, etc. are supplied to an electronic control device 90. The turbine rotation speed NT is the same as the rotation speed (input shaft rotation speed NIN) of the input shaft 32 that is an input member.

Figure 5:
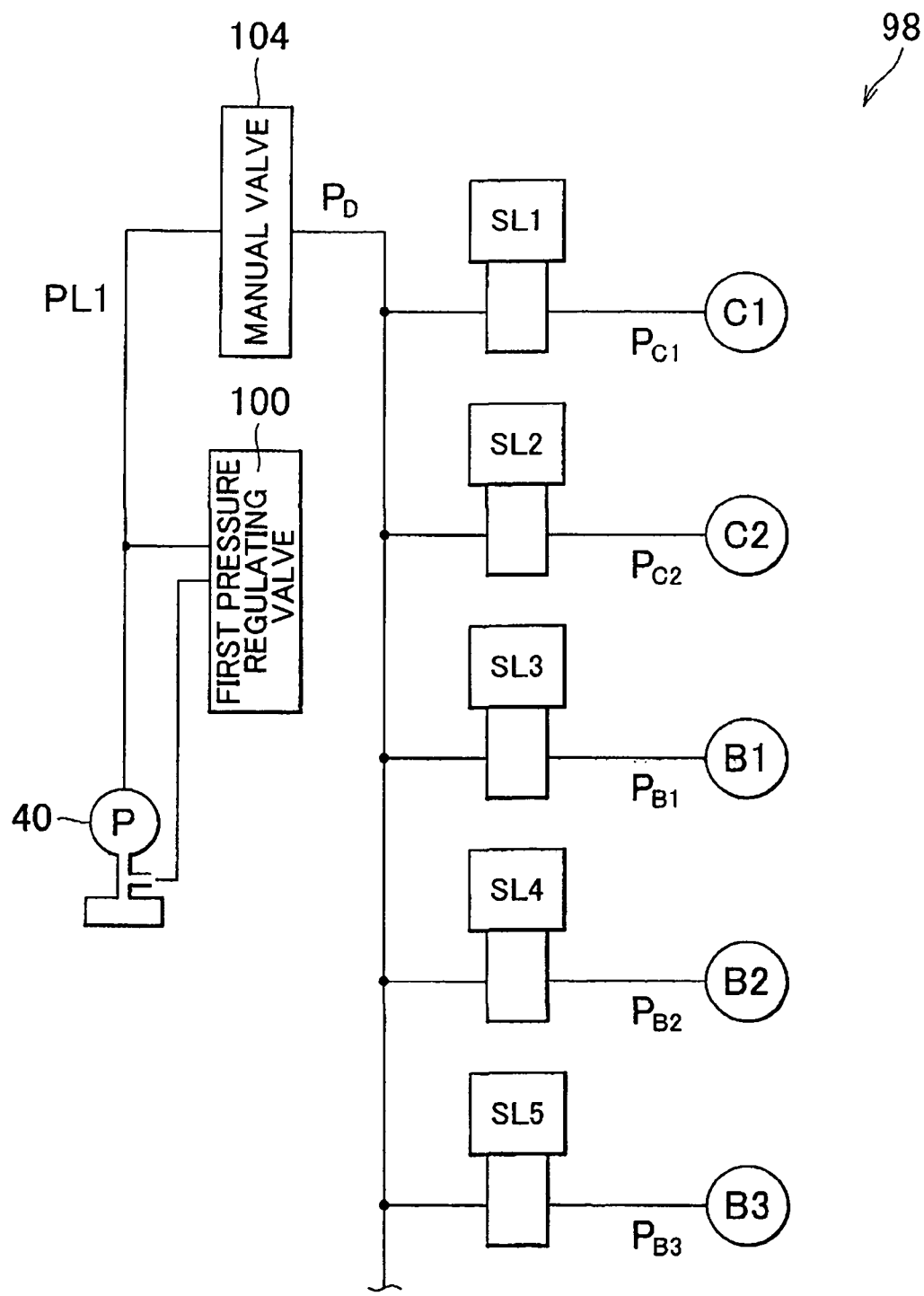
FIG. 5 is a circuit diagram illustrating the construction of a portion of a hydraulic control circuit shown in FIG. 3 which is related to the shift control of the automatic transmission.

The hydraulic control circuit 98 includes a circuit shown in FIG. 5, in connection with the shift control of the automatic transmission 14. In FIG. 5, the working oil that is pressure-fed from an oil pump 40 is regulated in pressure by a relief-type first pressure regulator valve 100 so as to become a first line pressure PL1. The oil pump 40 is a mechanical pump that is rotationally driven by the engine 10. The first pressure regulating valve 100 regulates the first line pressure PL1 in accordance with the turbine torque TT, that is, the input torque TIN of the automatic transmission 14, or its substitute value, that is, the throttle valve opening degree $\theta_{TH}$. The first line pressure PL1 is supplied to a manual valve 104 that is operated in association with the shift lever 72. Then, if the shift lever 72 is at a forward travel drive position such as the "D" position or the like, a forward travel position pressure PD based on the first line pressure PL1 is supplied from the manual valve 104 to the linear solenoid valves SL1 to SL5. The linear solenoid valves SL1 to SL5 are provided corresponding to the clutches C1, C2 and the brakes B1 to B3, respectively. The states of excitation of the linear solenoid valves SL1 to SL5 are controlled in accordance with drive signals output by the electronic control device 90, and therefore, the engagement oil pressures PC1, PC2, PB1, PB2, PB3 of the clutches C1, C2 and the brakes B1 to B3 are controlled independently of each other. Thus, any one of the first speed gear step "1st" to the sixth speed gear step "6th" can be selectively established. Each of the linear solenoid valves SL1 to SL5 is of a large-capacity type, and the output oil pressure thereof is directly supplied to a corresponding one of the clutches C1, C2 and the brakes B1 to B3. Thus, a direct pressure control of directly controlling the engagement oil pressures PC1, PC2, PB1, PB2, PB3 is performed.

Figure 6:
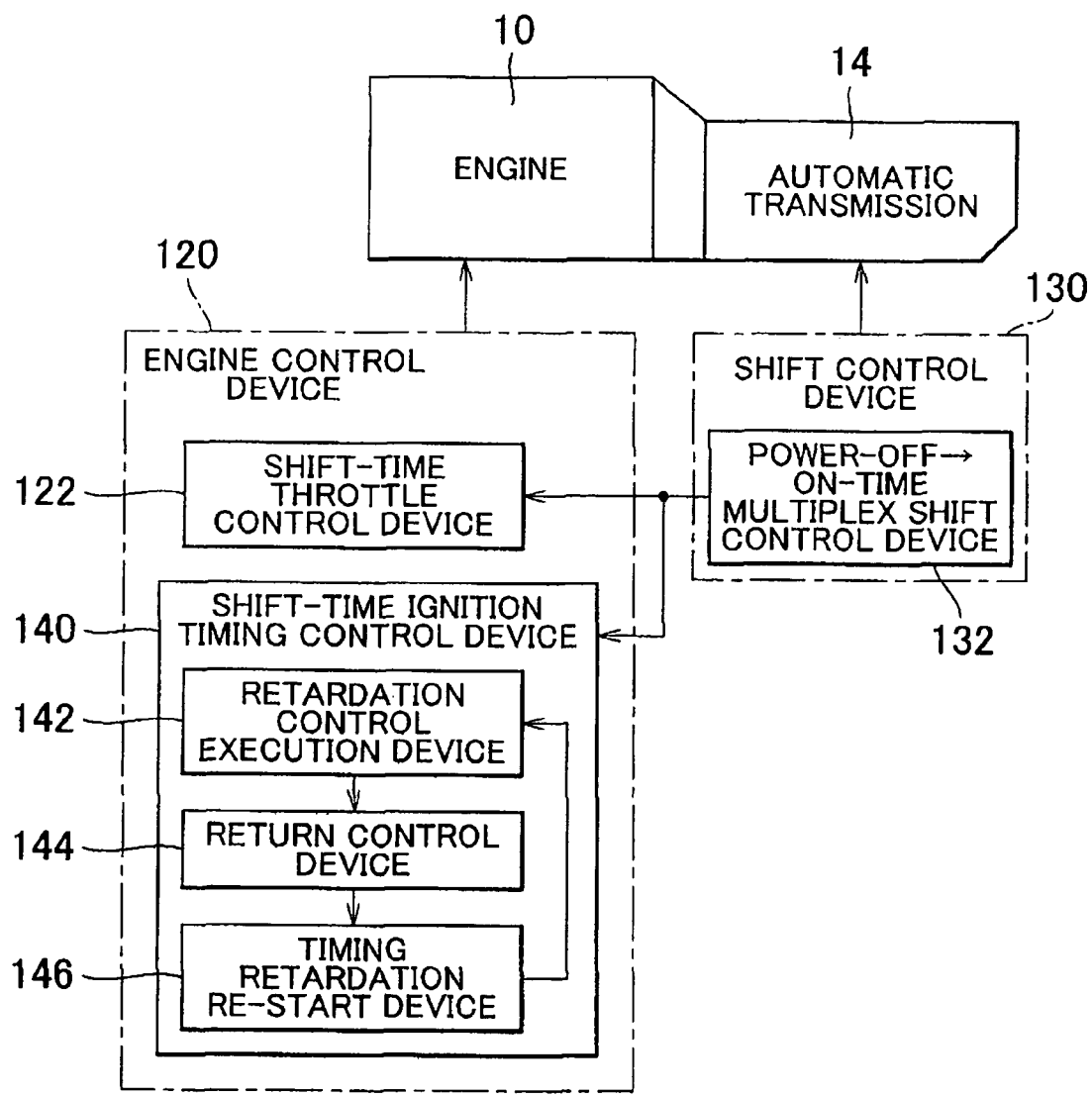
FIG. 6 is a block diagram illustrating functions that the electronic control device of FIG. 3 has.

The electronic control device 90 includes a so-called microcomputer that includes a CPU, a RAM, a ROM, an input/output interface, etc. The CPU executes various functions of an engine control device 120 and a shift control device 130 as shown in FIG. 6 by performing signal processing in accordance with programs pre-stored in the ROM while utilizing the temporary storage function of the RAM. The electronic control device 90 is constructed so as to have separate portions for engine control and shift control if necessary.

Figure 7:
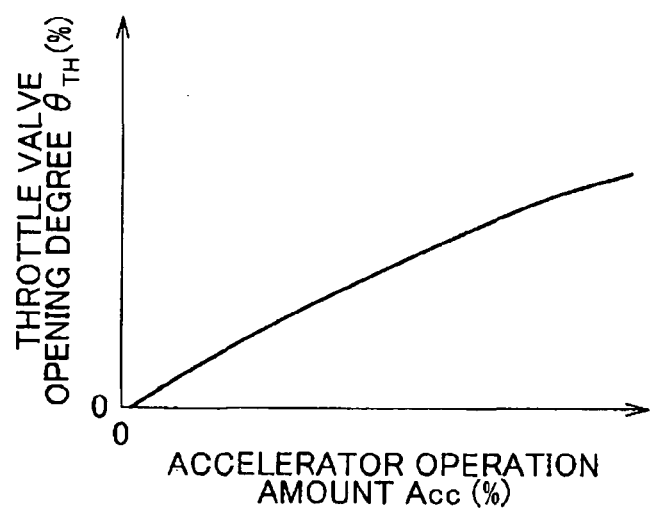
FIG. 7 is a diagram showing an example of a relationship between the accelerator operation amount Acc and the throttle valve opening degree $\theta_{TH}$ which is used in a throttle control performed by an engine control device shown in FIG. 6.

The engine control device 120 performs the output control of the engine 10. That is, the engine control device 120 controls the opening and closing of the electronic throttle valve 56 via the throttle actuator 54, and controls the fuel injection valve 92 for the fuel injection amount control, and controls an ignition device 94, such as an igniter or the liker, for the ignition timing control. As for the control of the electronic throttle valve 56, for example, the throttle actuator 54 is driven on the basis of the actual accelerator operation amount Acc from a relationship shown in FIG. 7, and the throttle valve opening degree $\theta_{TH}$ is increased with increases in the accelerator operation amount Acc. Besides, at the time of starting the engine 10, cranking is performed by a starter (electric motor) 96.

Figure 8:
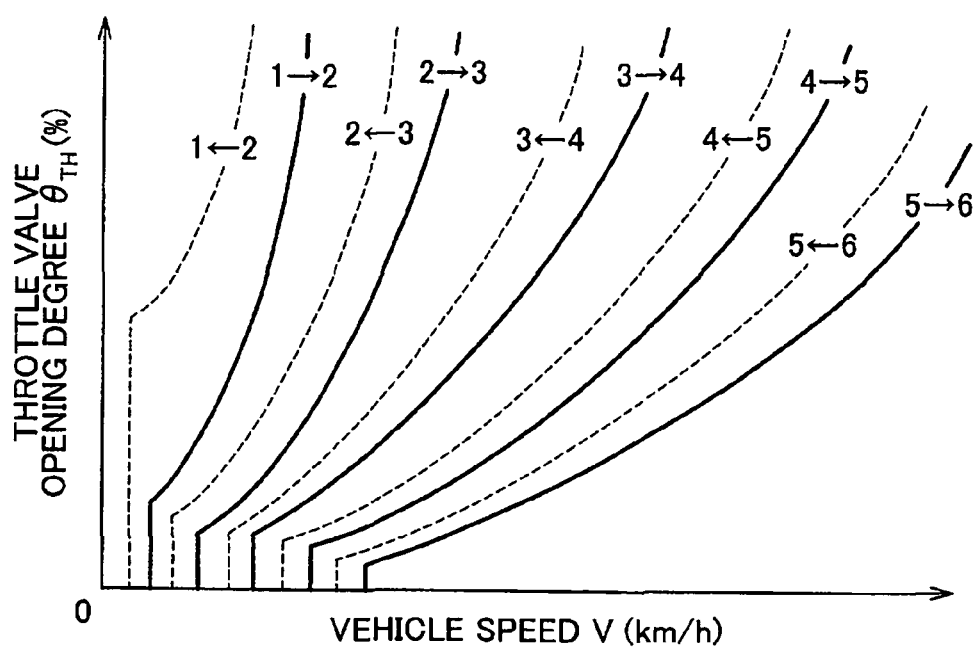
FIG. 8 is a diagram showing an example of a shift graph (map) used in the shift control of the automatic transmission performed by a shift control device shown in FIG. 6.

The shift control device 130 performs the shift control of the automatic transmission 14. For example, on the basis of the actual throttle valve opening degree $\theta_{TH}$ and the vehicle speed V from a pre-stored shift chart (shift map) shown in FIG. 8, a gear step to which the automatic transmission 14 (i.e., a post-shift gear step) needs to shift is determined, that is, judgment regarding a shift from the present gear step to a shift-target gear step is executed, and a shift output for starting a shift action for the determined gear step is accomplished, and the states of excitation of the linear solenoid valves SL1 to SL5 of the hydraulic control circuit 98 are continuously changed so that a shift shock, such as a driving power change or the like, will not occur and the durability of a friction member of the clutches C or the brakes B will not degrade. As is apparent from FIG. 2, the automatic transmission 14 of this embodiment is designed to perform the shift between consecutive gear steps by a clutch-to-clutch shift in which one of the clutches C and the brakes B is released and another one of them is engaged. In FIG. 8, solid lines are upshift lines, and broken lines are downshift lines. As the vehicle speed V becomes lower, or as the throttle valve opening degree $\theta_{TH}$ becomes larger, the gear step is switched to a lower-speed side gear step that has a larger speed change ratio. In FIG. 8, numerals "1" to "6" mean the first speed gear step "1st" to the sixth speed gear step "6th", respectively.

When the shift lever 72 is operated to the "D" position, a most significant D range (automatic shift mode) in which shifting is automatically performed among all the forward travel gear steps "1st" to "6th". If the shift lever 72 is operated to one of the "4" to "L" positions, a corresponding one of 4, 3, 2 and L shift range is established. In the 4 range, the shift control is performed among the fourth speed gear step "4th" and the lower forward travel gear steps. In the 3 range, the shift control is performed among the third speed gear step "3rd" and the lower forward travel gear steps. In the second range, the shift control is performed among the second sped gear step "2nd" and the lower forward travel gear step. In the L range, the gear step is fixed to the first speed gear step "1 st". Therefore, for example, if during a run with the sixth speed gear step "6th" in the D range, the shift lever 72 is operated from the "D" position to the "4" position, the "3" position, and then the "2" position, the shift range is switched in the sequence of D→4→3→2, with the gear step being compulsorily shifted down from the sixth speed gear step "6th" to the fourth speed gear step "4th", the third speed gear step "3rd", and then the second speed gear step "2nd". Thus, the gear step can be altered through manual operations.

The shift control of the automatic transmission 14 on an automatic or manual basis as described above is performed by changing the engagement-side oil pressure and/or the release-side oil pressure in accordance with a change pattern determined beforehand or changing the engagement-side oil pressure and/or the release-side oil pressure at predetermined change timing. The fashion of controlling the change pattern, the change timing, etc. is determined in accordance with the state of driving the vehicle, and the like, through synthetical consideration of the durability and the shift responsiveness of the clutches C and the brakes B, the shift shock, etc.

Figure 10:
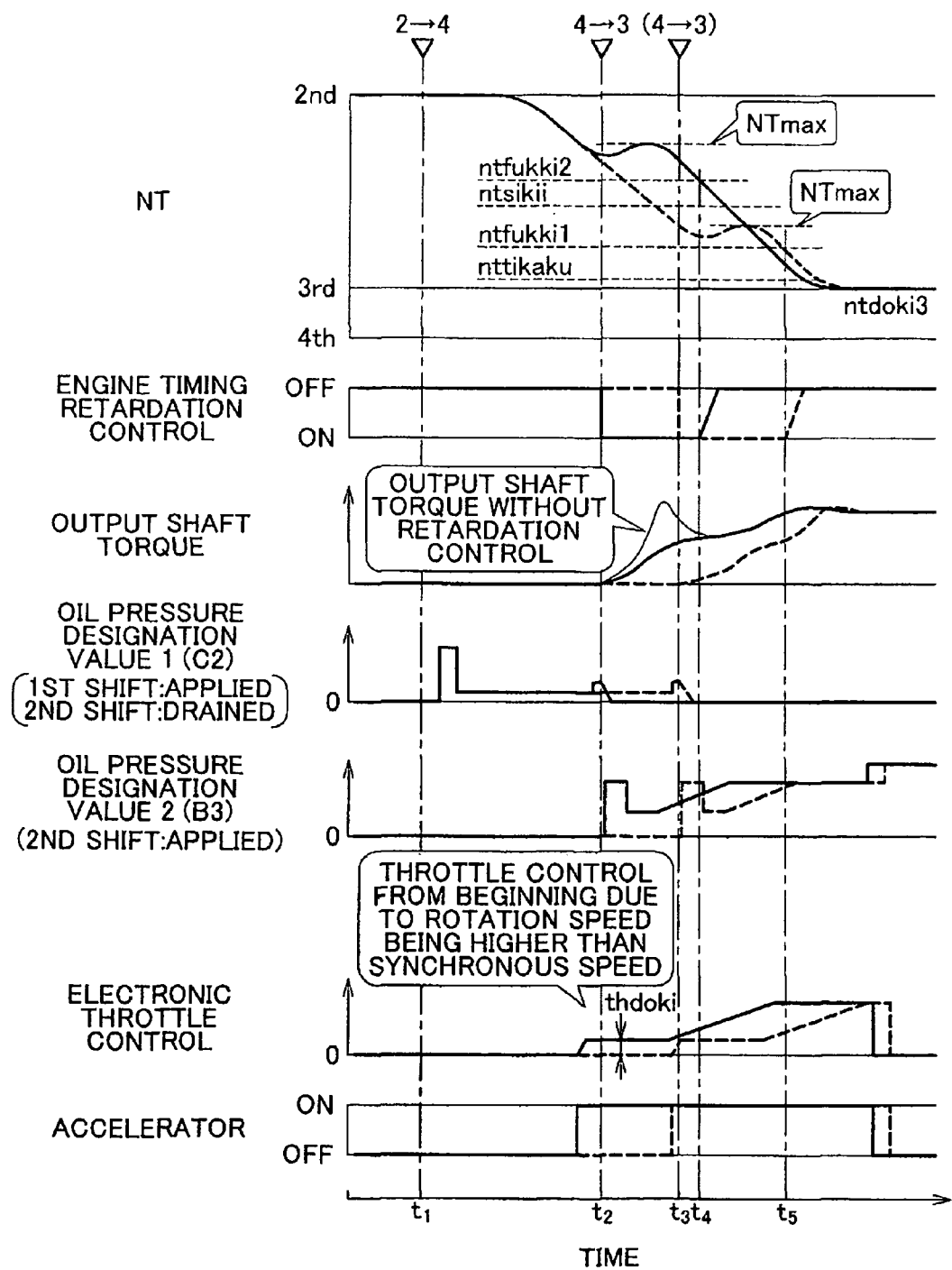
FIG. 10 is a diagram showing an example of a time chart of a case where a torque-down control is performed by the timing retardation in accordance with the flowchart of FIG. 9 during a 2→4→3 multiplex shift in response to a power-off→on operation.

The shift control device 130 further includes a power-off→on-time multiplex shift control device 132. If during a first shift in a power-off state, a second shift judgment for a power-on downshift is made, a second shift control of lowering the turbine rotation speed NT to the synchronous rotation speed of the post-second shift gear step through the engagement control of a friction engagement device (one of the clutches C and the brakes B) is performed in order to execute the second shift. FIG. 10 shows a case where, halfway through the shift operation of the first shift that is the power-off 2→4 upshift, specifically, before the second clutch C2, which is to be engaged in the 2→4 upshift, is completely engaged, the accelerator pedal 50 is depressed so that judgment for the power-on 4→3 downshift as the second shift is made. The oil pressure designation value 1 for the second clutch C2, which is released in the second shift control, is promptly lowered in connection with the 4→3 downshift judgment, and thus the second clutch C is immediately released. On the other hand, the oil pressure designation value 2 for the third brake B3, which is engaged in the second shift control, is set so that the oil pressure PB3 is promptly raised in connection with the 4→3 downshift judgment and so that through the engagement of the third brake B3, the turbine rotation speed NT is lowered. In this manner, the shift is caused to progress. Incidentally, as for the first brake B1, which is released in the 2→4 upshift, the oil pressure designation value therefore is controlled so that the first brake B1 is immediately released and the turbine rotation speed NT will be promptly lowered.

Time t1 in FIG. 10 is the time at which the 2→4 upshift, as the first shift, is made, and time t2 is the time at which the judgment for the 4→3 downshift as the second shift is made due to an accelerator operation performed as shown by a solid line, and time t3 is the time at which the judgment for the 4→3 downshift as the second shift is made due to an accelerator operation performed as shown by the indications of "2nd", "3rd" and "4th" on the vertical axis in the section of the turbine rotation speed NT in FIG. 10 represent the synchronous rotation speeds of those gear steps, and are each found by multiplying the vehicle speed, that is, the output shaft rotation speed NOUT, and the speed change ratio of the gear step. The turbine rotation speed NT being equal to the synchronous rotation speed of a gear step means the establishment of the gear step, and the turbine rotation speed NT being an intermediate value between the synchronous rotation speeds of gear steps means a shift operation being in progress. Besides, the oil pressure designation value 1 corresponds to the exciting current for the linear solenoid valve SL2 that controls the oil pressure PC2 of the second clutch C2, and the oil pressure designation value 2 corresponds to the exciting current for the linear solenoid valve SL5 that controls the oil pressure PB3 of the third brake 133. The actual oil pressures PC2, PB3 change with a delay from the oil pressure designation values 1, 2, respectively, and in a moderated form.

In the case shown in FIG. 10, the accelerator pedal 50 is depressed when the turbine rotation speed NT is higher than the synchronous rotation speed ntdoki3 of the third-speed gear step "3rd", which is a post-second shift gear step. In the case shown in FIG. 11, the accelerator pedal 50 is depressed when the turbine rotation speed NT is lower than the synchronous rotation speed ntdoki3. In this case, since there is a need to perform the engagement control of the third brake B3 by bringing the turbine rotation speed NT above the synchronous rotation speed ntdoki3, the engagement control of the third brake B3 is started at the time point when the turbine rotation speed NT reaches a predetermined engagement control start rotation speed that is determined on the basis of the synchronous rotation speed ntdoki3. The engagement control start rotation speed is set at a value that is lower by a predetermined value than the synchronous rotation speed ntdoki3, taking into account, for example, the response delay of the oil pressure PB3. This engagement control start rotation speed may be determined at a constant value, and may also be calculated from a computing equation, a data map, etc. that is determined beforehand by using as parameters the kind of shift, the states of the vehicle at the time of the second shift judgment (time t2), such as the turbine rotation speed NT, the AT oil temperature TOIL, etc., the states of driving the vehicle, etc.

Figure 11:
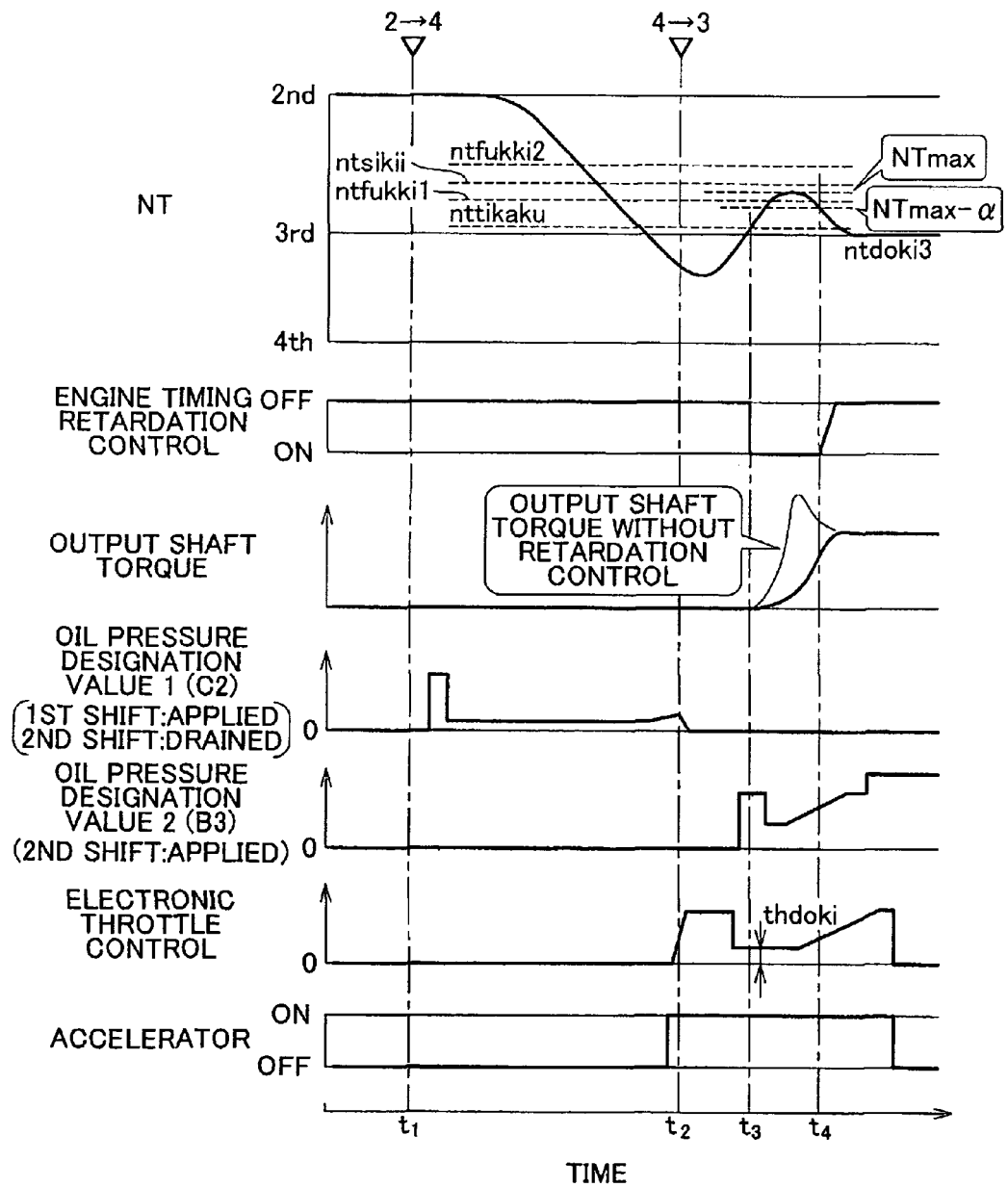
FIG. 11 is a diagram showing another example of a time chart of a case where the torque-down control is performed by the timing retardation in accordance with the flowchart of FIG. 9 during the 2→4→3 multiplex shift in response to a power-off→on operation.
Figure 12:
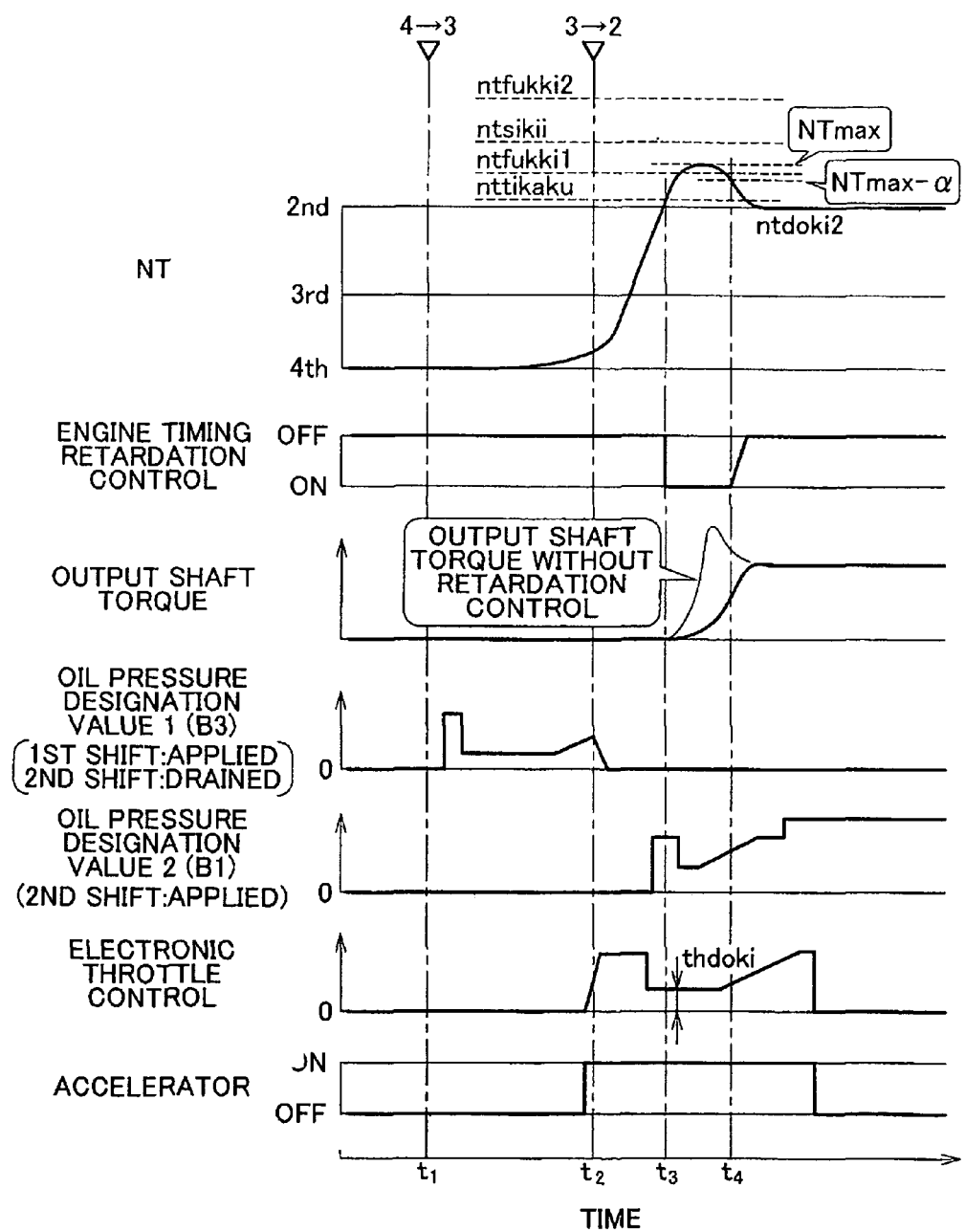
FIG. 12 is a diagram showing an example of a time chart of a case where the torque-down control is performed by the timing retardation in accordance with the flowchart of FIG. 9 during a 4→3→2 multiplex shift in response to a power-off→on operation.

FIG. 12 shows the case where, halfway through the shift operation of the power-off 4→3 downshift as the first shift, that is, before the third brake B3, which is to be engaged in the 4→3 downshift, is completely engaged, the accelerator pedal 50 is depressed so that judgment for the power-on 3→2 downshift as the second shift is made. In this case, the oil pressure designation value 1 related to the third brake B3 released in the second shift control is promptly lowered in connection with the 3→2 downshift judgment, and thus the third brake B3 is immediately released. On the other hand, as for the oil pressure designation value 2 related to the first brake B1, which is engaged in the second shift control, there is a need to perform the engagement control of the first brake B1 by bringing the turbine rotation speed NT above the synchronous rotation speed ntdoki2 of the second-speed gear step "2nd", the post-second shift gear step. Therefore, the engagement control of the first brake B1 is started at the time point when the turbine rotation speed NT reaches a predetermined engagement control start rotation speed that is determined on the basis of the synchronous rotation speed ntdoki2. The engagement control start rotation speed in this case, too, is determined in substantially the same manner as the oil pressure designation value 2 indicated in FIG. 11.

Referring back to FIG. 6, the engine control device 120 includes a shift-time throttle control device 122 and a shift-time ignition timing control device 140, and temporarily reduces the engine torque when a power-on downshift (second shift) is performed by the power-off→on-time multiplex shift control device 132. When the engagement control is performed by the power-off→on-time multiplex shift control device 132 bringing the turbine rotation speed NT above the synchronous rotation speed of the post-second shift gear step, the shift-time throttle control device 122 performs a closing control of reducing the throttle valve opening degree $\theta_{TH}$ of the engine 10 to a predetermined degree of opening thdoki that causes the output of a torque that can bring the turbine rotation speed NT to a rotation speed that is higher than the synchronous rotation speed of the post-second shift gear step. This prevents excessive sharp rise in the rotation speed while allowing the turbine rotation speed NT to reach a rotation speed that is higher than the synchronous rotation speed of the post-second shift gear step. The degree of opening thdoki reached in this throttle closing operation may be determined beforehand at a constant value, and may also be calculated from a computing equation, a data map, etc. that is determined by using as parameters the kind of shift, the states of the vehicle at the time of the second shift judgment, such as the engine rotation speed NE, the turbine rotation speed NT, the AT oil temperature TOIL, etc., the states of driving the vehicle, etc.

The closing control of reducing the throttle valve opening degree $\theta_{TH}$ is intended to prevent sharp rise in the turbine rotation speed NT. If the turbine rotation speed NT at the time of the second shift judgment (time t2 or t3) is higher than the synchronous rotation speed ntdoki3 as in FIG. 10, there is a need to reduce the turbine rotation speed NT, and therefore, the closing control is immediately started in connection with the second shift judgment. However, in FIG. 10, since the first shift is the 2→4 upshift and therefore it is naturally necessary to reduce the turbine rotation speed NT, the throttle valve opening degree $\theta_{TH}$ is restricted from the beginning.

On the other hand, if the turbine rotation speed NT at the time of the second shift judgment (time t2) is lower than the synchronous rotation speed ntdoki3 as in FIG. 11, there is a need to bring the turbine rotation speed NT above the synchronous rotation speed ntdoki3. Therefore, the closing control of reducing the throttle valve opening degree $\theta_{TH}$ is started at the time point when the turbine rotation speed NT reaches a predetermined closing control start rotation speed that is determined on the basis of the synchronous rotation speed ntdoki3. This closing control start rotation speed is set at a value that is lower by a predetermined value than the synchronous rotation speed ntdoki3, taking into account, for example, a delay time of the engine torque change associated with the closing control. Normally, the closing control start rotation speed is set at a value that is further lower than the engagement control start rotation speed. Besides, this closing control start rotation speed may be set at a constant value, and may also be calculated from a computing equation, a data map, etc. that is determined by using as parameters the kind of shift, the states of the vehicle at the time of the second shift judgment, such as the engine rotation speed NE, the turbine rotation speed NT, the AT oil temperature TOIL, etc., the states of driving the vehicle, etc. As shown in FIG. 12, in the multiplex downshift of 4→3→2 due to a power-off→on operation, it is also necessary that the turbine rotation speed NT be higher than the synchronous rotation speed ntdoki2, and the start timing of the closing control is determined substantially in the same manner as in the case of FIG. 11.

Figure 13:
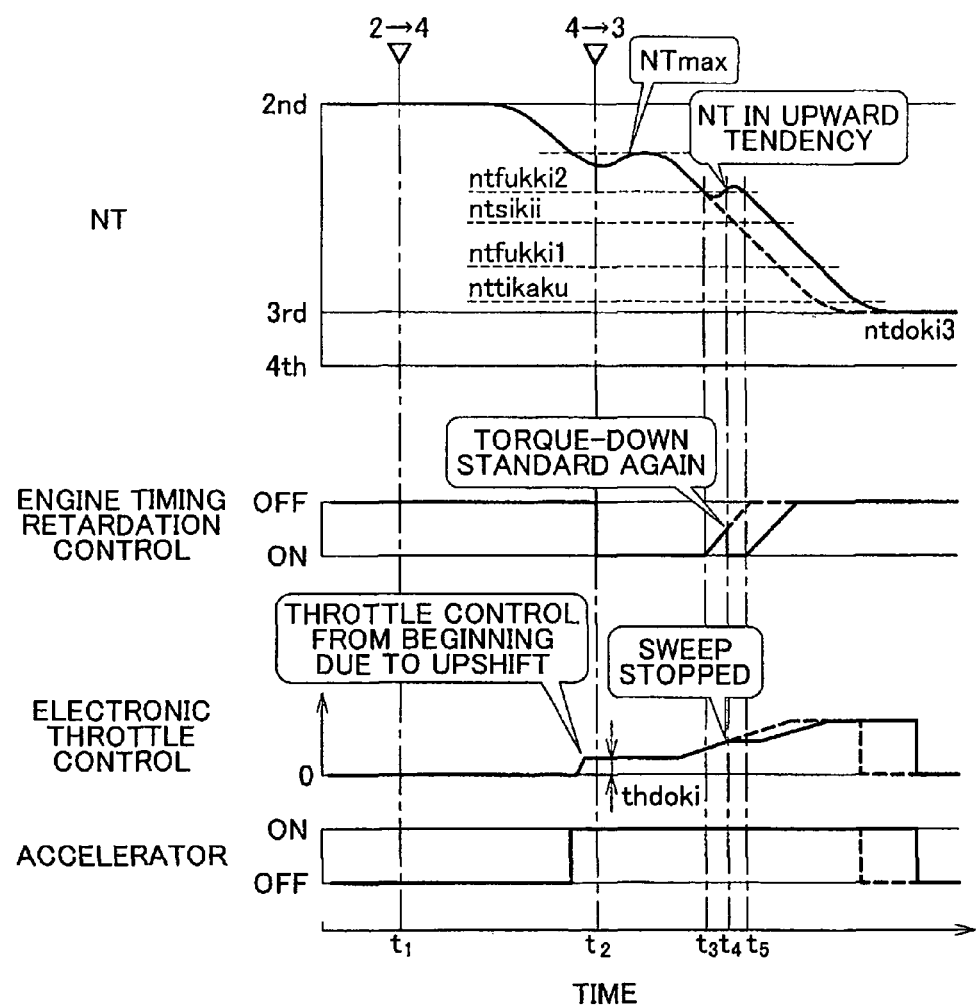
FIG. 13 shows another example of a time chart of a case where the torque-down control is performed by the timing retardation in accordance with the flowchart of FIG. 9 during the 2→4→3 multiplex shift in response to a power-off→on operation, and where a retardation control is performed again due to the turbine rotation speed NT beginning to rise during a torque return control.

The closing control of reducing the throttle valve opening degree $\theta_{TH}$ is performed, for example, until the turbine rotation speed NT takes a downward tendency. When it is detected that the turbine rotation speed NT has taken a downward tendency, the control is returned to the ordinary throttle control by gradually opening the throttle valve opening degree $\theta_{TH}$ at a predetermined gradient to a degree of opening that corresponds to the acceleration operation amount Acc. However, if halfway through the returning control, the turbine rotation speed NT takes an upward tendency, for example, as shown in FIG. 13, the sweep or gradual increase of the throttle valve opening degree $\theta_{TH}$ is stopped, and the then-occurring degree of opening is maintained. Then, when the turbine rotation speed NT begins to go down again, the sweep or gradual increase of the throttle valve opening degree $\theta_{TH}$ is started again.

Figure 9:
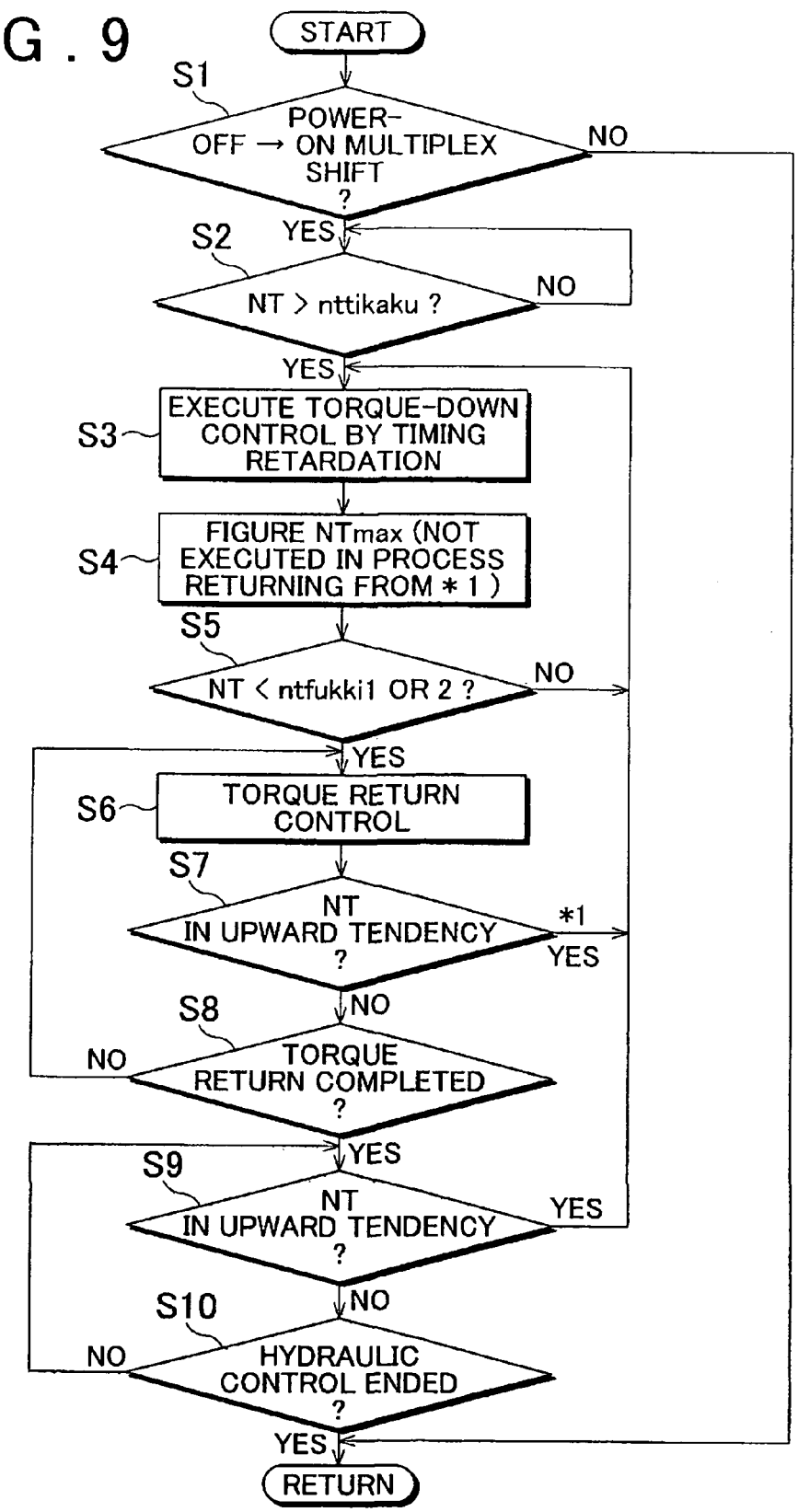
FIG. 9 is a flowchart that concretely illustrates the content of a process of a shift-time ignition timing control device shown in FIG. 6.

Referring back to FIG. 6, the shift-time ignition timing control device 140 is a device for temporarily dropping the engine torque by the retardation control of the ignition timing of the engine 10 when dropping the turbine rotation speed NT through the engagement control of a concerned friction engagement device performed by the power-off→on-time multiplex shift control device 132. The shift-time ignition timing control device 140 functionally includes a retardation control execution device 142, a return control device 144, and a timing retardation re-start device 146, and performs signal processing in accordance with a flowchart shown in FIG. 9. In FIG. 9, step S3 corresponds to the retardation control execution device 142, and steps S4 to S6 and S8 correspond to the return control device 144, and steps S7 and S9 correspond to the timing retardation re-start device 146.

In step S1 in FIG. 9, it is judged whether or not a shift judgment for performing a shift control by the power-off→on-time multiplex shift control device 132, that is, a second shift judgment, is made. If the second shift judgment is made, step S2 and the subsequent steps are executed. In step S2, it is judged whether or not the turbine rotation speed NT is greater than or equal to a predetermined retardation control start rotation speed nttikaku. If NT≧nttikaku, step S3 is executed, in which a torque-down control through the retardation of the ignition timing is performed. That is, if the turbine rotation speed NT at the time of the second shift judgment (time t2 or t3) is greater than or equal to the retardation control start rotation speed nttikaku as in FIG. 10, the retardation control of step S3 is immediately performed. If as in FIGS. 11 and 12 the turbine rotation speed NT at the time of the second shift judgment (time t2) is less than the retardation control start rotation speed nttikaku, the retardation control of step S3 is started at the time point t3 when the turbine rotation speed NT becomes equal to or greater than the retardation control start rotation speed nttikaku. Therefore, there is no risk of the retardation control of the ignition timing impeding the drop or rise of the turbine rotation speed NT, and thus the shift is promptly caused to progress. In particular, if at the time of the second shift judgment, NT≧nttikaku, then the timing retardation control is started immediately, so that the fall of the turbine rotation speed NT is promoted, and the shift progresses even more promptly.

Thus, when turbine rotation speed NT is lowered to the synchronous rotation speed of the post-second shift gear step through the engagement control of the friction engagement devices by the power-off→on-time multiplex shift control device 132, the engine torque is dropped through the retardation control of the ignition timing of the engine 10, so that the peak in the output shaft torque caused by the inertia torque of the engine 10 and the like is reduced and the shift shock is restrained. The retardation control start rotation speed nttikaku at this time is basically determined on the basis of the synchronous rotation speed of the post-second shift gear step. In this embodiment, taking, for example, the engagement control start rotation speed, into account, the retardation control start rotation speed nttikaku is set at a rotation speed that is slightly higher than the engagement control start rotation speed, that is, at a value that is slightly higher than the synchronous rotation speed of the post-second shift gear step, so that the engine torque drops in response to the start of the engagement control of the friction engagement devices by the power-off→on-time multiplex shift control device 132. The retardation control start rotation speed nttikaku may be determined beforehand at a constant value, and may also be calculated from a computing equation, a data map, etc. that is determined by using as parameters the kind of shift, the states of the vehicle at the time of the second shift judgment, such as the engine rotation speed NE, the turbine rotation speed NT, the AT oil temperature TOIL, etc., the states of driving the vehicle, etc. Besides, in the retardation control of ignition timing at this time, the ignition timing is altered straightaway to a maximum value of retardation.

In step S4, a maximum value NTmax of the turbine rotation speed NT during the execution of the retardation control is figured, and a first return rotation speed ntfukki1 or a second return rotation speed ntfukki2 is set in accordance with whether or not the maximum value NTmax is less than a predetermined switch determination speed ntsikii. The switch determination speed ntsikii is a value that is higher than the synchronous rotation speed of the post-second shift gear step. If NTmax<ntsikii, the first return rotation speed ntfukki1 between the synchronous rotation speed of the post-second shift gear step and the switch determination speed ntsikii is set. If NTmax≧ntsikii, the second return rotation speed ntfukki2, higher than the switch determination speed ntsikii, is set. However, if step S3 and the subsequent steps are repeated due to the judgment in step S7 being YES (affirmative), a new maximum value NTmax is not found, but the previous return rotation speed ntfukki1 or ntfukki2 is directly used. Each of the switch determination speed ntsikii and the return rotation speeds ntfukki1, ntfukki2 may be determined beforehand at a constant value, and may also be calculated from a computing equation, a data map, etc. that is determined by using as parameters the kind of shift, the states of the vehicle at the time of the second shift judgment, such as the engine rotation speed NE, the turbine rotation speed NT, the AT oil temperature TOIL, etc., the states of driving the vehicle, etc.

In step S5, it is judged whether or not the turbine rotation speed NT has become less than the return rotation speed ntfukki1 or ntfukki2 set in step S4. Until NT<ntfukki1 or ntfukki2 holds, step S3 is repeated. Then, if NT<ntfukki1 or ntfukki2 holds, the torque return control in step S6 is executed, in which the amount of retardation of the ignition timing is decreased by a predetermined amount at a time. In that case, in this embodiment, if the difference between the maximum value NTmax and the return rotation speed ntfukki1 or ntfukki2 is less than a predetermined value α, the torque return control of step S6 is started after the turbine rotation speed NT becomes less than a value of (NTmax−α). Specifically, if the torque return control is started at the return rotation speed ntfukki1 or ntfukki2 when the difference between the maximum value NTmax and the return rotation speed ntfukki1 or ntfukki2 is small, there is a risk of the turbine rotation speed NT beginning to rise again. Therefore, the torque return control is started after the turbine rotation speed NT becomes less than the value of (NTmax−α). In this manner, the torque return control is started in a stage where the turbine rotation speed NT has certainly taken a downward tendency due to the engagement of the friction engagement device concerned, so that the possibility of the turbine rotation speed NT beginning to rise again due to the influence of the torque return control becomes small.

Subsequently in step S7, it is judged whether or not the turbine rotation speed NT is in an upward tendency. If it is in an upward tendency, step S3 and the subsequent steps are executed again. Ordinarily, however, the turbine rotation speed NT is in a downward tendency, and therefore step S8 is executed. Whether or not the turbine rotation speed NT is in an upward tendency may be judged simply from a change in the turbine rotation speed NT. Furthermore, a change in the vehicle speed V or the like may also be taken into account. In a possible example manner, using as a reference the synchronous rotation speed of the post-second shift gear step, it may be judged whether or not the turbine rotation speed NT is apart from the synchronous rotation speed, and if the turbine rotation speed NT is apart therefrom, it may be judged that the turbine rotation speed NT is in an upward tendency. The same thing can be said about the maximum value NTmax. In step S8, it is judged whether or not the torque return control has been completed, that is, whether or not the amount of retardation of the ignition timing has returned to 0. Until the amount of retardation is 0, steps S6 to S8 are repeatedly executed, whereby the amount of retardation is gradually deceased by the predetermined amount at a time and therefore the engine torque is returned to the original torque.

The solid lines in FIG. 10 show the case where the maximum value NTmax is greater than or equal to the switch determination speed ntsikii and therefore the second return rotation speed ntfukki2 is set. In this case, at the time t4 when the turbine rotation speed NT becomes less than the second return rotation speed ntfukki2, the torque return control in steps S6 to S8 is started. After that, therefore, the amount of retardation is gradually decreased. The broken lines in FIG. 10 show the case where the maximum value NTmax is less than the switch determination speed ntsikii and therefore the first return rotation speed ntfukki1 is set. In this case, at the time t5 when the turbine rotation speed NT becomes less than the first return rotation speed ntfukki1, the torque return control in steps S6 to S8 is started. After that, the amount of retardation is gradually decreased. FIGS. 11 and 12 also show cases where the maximum value NTmax is less than the switch determination speed ntsikii and the first return rotation speed ntfukki1 is set. In either case, however, the difference (NTmax−ntfukki1) between the maximum value NTmax and the first return rotation speed ntfukki1 is less than the predetermined value α; therefore, in a stage where the time t4 when the turbine rotation speed NT has become less than the value of (NTmax−α) is reached, the torque return control in steps S6 to S8 is started, and after that, the amount of retardation is gradually decreased.

On the other hand, FIG. 13, similar to the solid lines of FIG. 10, shows a case where the retardation control of the ignition timing is performed and the torque return control in steps S6 to S8 is started. In the case shown in FIG. 13, however, due to influence of the torque return control, the turbine rotation speed NT begins to rise again, and therefore the judgment in step S7 is YES at time t4. In this case, step S3 is executed, in which the torque-down control by timing retardation is started again, and the amount of retardation of the ignition timing is maximized. This, together with the sweep or gradual increase of the throttle valve opening degree $\theta_{TH}$ being stopped by the shift-time throttle control device 122, drops the engine torque. Through the engagement control of the friction engagement device (third brake B3), the turbine rotation speed NT is dropped again relatively promptly, and the load on the friction engagement device (third brake B3) is lightened. Thus, the durability improves. Besides, in step S4, the original return rotation speed, that is, the second ntfukki2 in FIG. 13, is directly set, without figuring the maximum value NTmax again. When the turbine rotation speed NT becomes less than the second return rotation speed ntfukki2 (time t5), the torque return control in steps S6 to S8 is performed again. Incidentally, the broken lines in FIG. 13 show a case where the second shift control is performed without the turbine rotation speed NT rising again as shown by the solid line in FIG. 10.

If the turbine rotation speed NT is less than the second return rotation speed ntfukki2 when it is judged that the turbine rotation speed NT is in an upward tendency, the judgment in step S5 is YES followed by the execution of step S6 and the subsequent steps although the turbine rotation speed NT is in an upward tendency. However, since the judgment in step S7 is YES, and the process returns to step S3, so that the amount of retardation of the ignition timing is returned to the maximum value. Specifically, the amount of retardation of the ignition timing is kept substantially at the maximum value and the torque-down control is continued until the turbine rotation speed NT takes a downward tendency. When the turbine rotation speed NT takes a downward tendency and the judgment in step S7 becomes NO (negative), steps S6 to S8 are repeated, whereby the amount of retardation is gradually decreased and the engine torque is returned to the original torque. Thus, the torque return control in steps S6 to S8 is performed substantially on the condition that the turbine rotation speed NT is in a downward tendency. Incidentally, a step of judging whether or not the turbine rotation speed NT is in a downward tendency may be provided before or after step S5, and step S6 and the subsequent steps may be executed on the condition that the turbine rotation speed NT is in a downward tendency.

Referring back to FIG. 9, when the amount of retardation of the ignition timing becomes 0 and the torque return control ends, the judgment in step S8 becomes YES, and subsequently step S9 is executed. In step S9, it is judged as in step S7 whether or not the turbine rotation speed NT is in an upward tendency. If the turbine rotation speed NT is in an upward tendency, the retardation control in step S3 and the subsequent steps is executed again. Specifically, since there is a possibility of the turbine rotation speed NT rising again in connection with the end of the retardation control of the ignition timing, the retardation control in step S3 and the subsequent steps is executed again, whereby the second shift is reliably caused to progress and the load on the friction engagement device is lightened.

Figure 14:
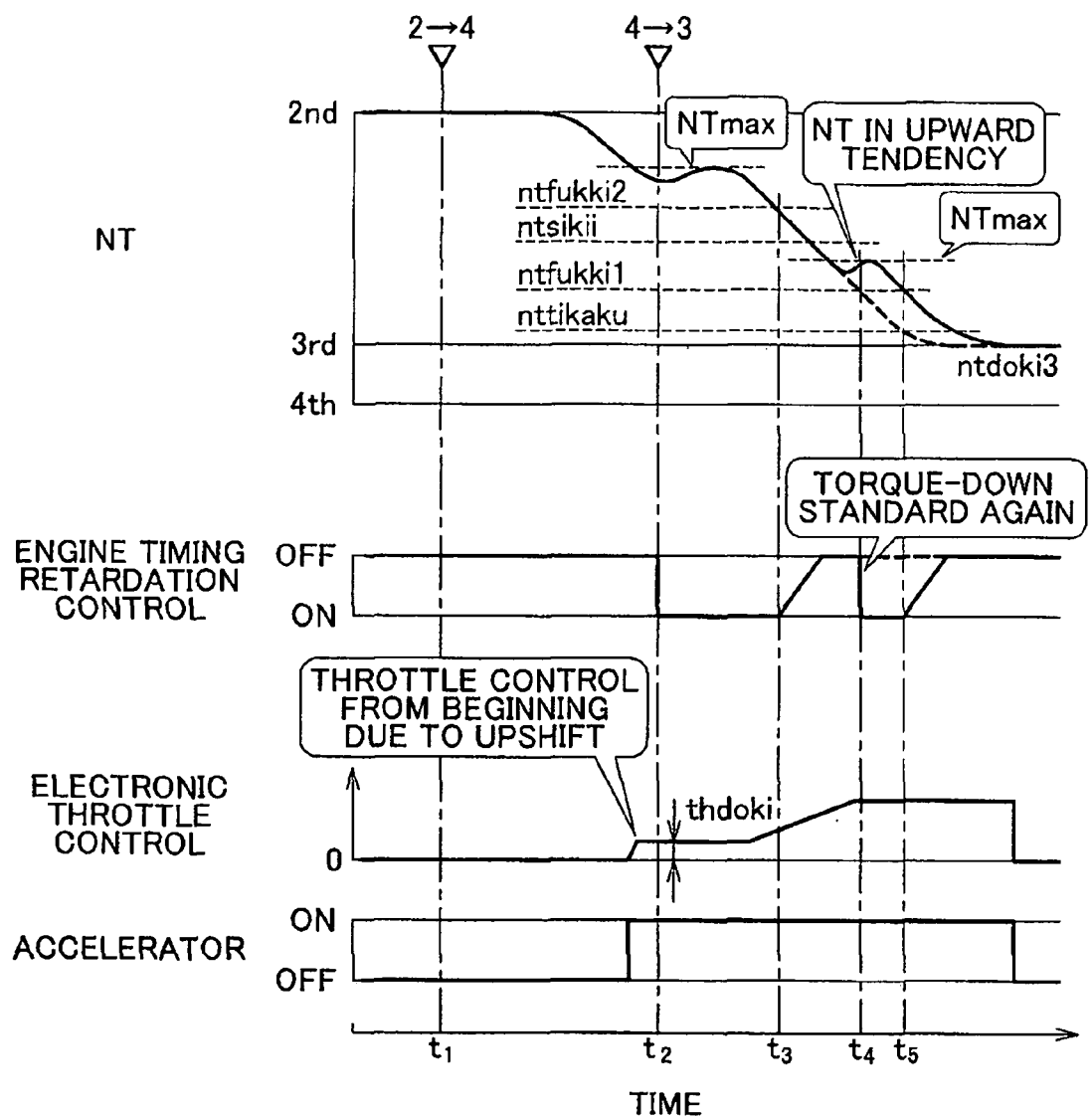
FIG. 14 shows another example of a time chart of a case where the torque-down control is performed by the timing retardation in accordance with the flowchart of FIG. 9 during the 2→4→3 multiplex shift in response to a power-off→on operation, and where the retardation control is performed again due to the turbine rotation speed NT beginning to rise after the torque return control has ended.

FIG. 14, similar to the solid lines in FIG. 10, shows a case where the retardation control of the ignition timing is performed and the torque return control in steps S6 to S8 is performed. In the case of FIG. 14, however, after the torque return control ends, the turbine rotation speed NT begins to rise, and the judgment in step S9 becomes YES at time t4. In this case, step S3 is executed, in which the torque-down control by timing retardation is started again, and the amount of retardation of the ignition timing is maximized. This drops the engine torque. Through the engagement control of the friction engagement device (third brake B3), the turbine rotation speed NT is dropped again relatively promptly, and the load on the friction engagement device (third brake B3) is lightened. Thus, the durability improves. Besides, in step S4, a maximum value NTmax is figured again, and on the basis of the new maximum value NTmax, the return rotation speed ntfukki1 or ntfukki2 (in FIG. 14, the first return rotation speed ntfukki1) is set. When the turbine rotation speed NT becomes less than the new return rotation speed ntfukki1 or ntfukki2 (time t5), the torque return control in steps S6 to S8 is performed again. In this manner, since the maximum value NTmax is figured again and the return rotation speed ntfukki1 or ntfukki2 is newly set, the torque return control is more appropriately performed. Incidentally, the broken line in FIG. 14 shows a case where the second shift control is performed without the turbine rotation speed NT rising again halfway through the control as shown by the solid line in FIG. 10.

If the judgment in step S9 is NO, that is, if the turbine rotation speed NT is not in an upward tendency, step S10 is executed. In step S10, it is judged whether or not the hydraulic control by the power-off→on-time multiplex shift control device 132 has ended, that is, whether or not the engagement oil pressure of the engagement-side friction engagement device has been brought to a maximum value. Until the hydraulic control ends, step S9 and the subsequent steps are repeatedly executed. When the hydraulic control ends, the series of ignition timing retardation control is ended. Thus, since the step S9 is repeatedly executed and, if necessary, the retardation control of the ignition timing is performed until the hydraulic control ends, the load on the friction engagement devices is lightened.

Thus, according to the shift control device of this embodiment, when during the first shift in the power-off state, the second shift that is a power-on downshift is performed, that is, when the engagement-release control of the friction engagement devices is performed by the power-off→on-time multiplex shift control device 132, the closing control of reducing the throttle valve opening degree $\theta_{TH}$ of the engine 10 to the predetermined degree of opening thdoki that causes the output of a torque that can bring the turbine rotation speed NT to a rotation speed that is higher than the synchronous rotation speed of the post-second shift gear step is performed. Therefore, it is possible to prevent excessive sharp rise in the rotation speed while allowing the turbine rotation speed NT to reach a rotation speed that is higher than the synchronous rotation speed of the post-second shift gear step.

Besides, when the turbine rotation speed NT is lowered to the synchronous rotation speed of the post-second shift gear step through the engagement control of the friction engagement device performed by the power-off→on-time multiplex shift control device 132, the retardation control of the ignition timing of the engine 10 is performed to drop the engine torque. Therefore, the peak in the output shaft torque caused by the inertia torque of the engine 10 and the like is reduced and the shift shock is restrained.

Besides, if the turbine rotation speed NT at the time of the second shift judgment is less than the predetermined retardation control start rotation speed nttikaku, the retardation control is started at the time point when the turbine rotation speed NT becomes greater than or equal to the retardation control start rotation speed nttikaku. Therefore, the turbine rotation speed NT promptly rises, so that second shift is caused to progress quickly. If the turbine rotation speed NT at the time of the second shift judgment is greater than or equal to the retardation control start rotation speed nttikaku, the retardation control is immediately started at the time point of the second shift judgment. Therefore, the turbine rotation speed NT promptly drops, so that the second shift is caused to progress quickly. Furthermore, since the retardation control start rotation speed nttikaku is set corresponding to the engagement control start rotation speed for starting the engagement control of the friction engagement device performed by the power-off→on-time multiplex shift control device 132, the retardation control of the ignition timing is started in accordance with the engagement control, so that the peak in the output shaft torque in connection with the engagement of the friction engagement device can be effectively reduced.

Besides, the return rotation speed for returning from the retardation control is switched between the values ntfukki1 and ntfukki2 in accordance with the maximum value NTmax of the turbine rotation speed NT during the execution of the retardation control, that is, the value of rotation speed at which the turbine rotation speed NT begins to drop due to the engagement of the friction engagement device. Therefore, the return from the retardation control of the ignition timing is accomplished substantially in accordance with the torque capacity of the friction engagement device. Accordingly, the output shaft torque can be promptly raised while the re-rise in the turbine rotation speed NT due to the torque return is restrained. Thus, the vehicle driving performance at the time of shift becomes more favorable.

Besides, if after the return from the retardation control starts, the engagement of the friction engagement device is insufficient and the turbine rotation speed NT takes an upward tendency, then the retardation control is started again to drop the engine torque. Therefore, by the engagement control of the friction engagement device, the turbine rotation speed NT is dropped again relatively promptly and the shift is caused to accordingly progress, and at the same time, the load on the friction engagement device is lightened, thus improving the durability.

While the embodiment of the invention has been described in detail above with reference to the drawings, this is a mere embodiment, and the invention can be carried out in various manners with modifications and improvements based on the knowledge of those with ordinary skill in the art.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A shift control device of a vehicular automatic transmission that establishes a plurality of gear steps of different speed change ratios by selectively engaging a plurality of friction engagement devices, and speed-changes rotation transferred from an engine to an input shaft, and outputs speed-changed rotation, in which if during a first shift in a power-off state, a second shift judgment for a second shift that is a power-on downshift is made, performs a second shift control of lowering an input shaft rotation speed to a synchronous rotation speed of a post-second shift gear step through an engagement control of the friction engagement devices in order to execute the second shift, the shift control device comprising:

a shift-time throttle controller that, when the second shift is performed, performs a control of reducing a throttle valve opening degree of the engine to a predetermined degree of opening that causes the engine to output a torque that is able to bring the input shaft rotation speed of the input shaft to a rotation speed that is higher than the synchronous rotation speed of the post-second shift gear step; and a shift-time ignition timing controller that executes a retardation control of retarding an ignition timing of the engine when the input shaft rotation speed is dropped through the second shift control;

wherein if the input shaft rotation speed at a time of the second shift judgment is greater than or equal to a retardation control start rotation speed that is determined on a basis of the synchronous rotation speed of the post-second shift gear step, the shift-time ignition timing controller starts the retardation control at a time point of the second shift judgment, and wherein if the input shaft rotation speed at the time of the second shift judgment is less than the retardation control staff rotation speed, the shift-time ignition timing controller starts the retardation control at a time point when the input shaft rotation speed becomes equal to or greater than the retardation control staff rotation speed.

2. A shift control device of a vehicular automatic transmission that establishes a plurality of gear steps of different speed change ratios by selectively engaging a plurality of friction engagement devices, and speed-changes rotation transferred from an engine to an input shaft, and outputs speed-changed rotation, in which if during a first shift in a power-off state, a second shift judgment for a second shift that is a power-on downshift is made, performs a second shift control of lower an input shaft rotation speed to a synchronous rotation speed of a post-second shift gear step through an engagement control of the friction engagement devices in order to execute the second shift, the shift control device comprising:

a shift-time throttle controller that, when the second shift is performed, performs a control of reducing a throttle valve opening degree of the engine to a predetermined degree of opening that causes the engine to output a torque that is able to bring the input shaft rotation speed of the input shaft to a rotation speed that is higher than the synchronous rotation speed of the post-second shift gear step; and a shift-time ignition timing controller that executes a retardation control of retarding an ignition timing of the engine when the input shaft rotation speed is dropped through the second shift control;

wherein the shift time ignition timing controller calculates a maximum value of the input shaft rotation speed during execution of the retardation control, and wherein the shift-time ignition timing controller judges whether or not the maximum value is less than a predetermined switch determination speed that is higher than the synchronous rotation speed of the post-second shift gear step, and if it is judged that the maximum value is less than the switch determination speed, the shift-time ignition timing controller causes a return from the retardation control on a condition that the input shaft rotation speed is less than a first return rotation speed, and if it is judged that the maximum value is greater than or equal to the switch determination speed, the shift-time ignition timing controller causes the return from the retardation control on a condition that the input shaft rotation speed is less than a second return rotation speed that is higher than the first return rotation speed.

3. The shift control device of the vehicular automatic transmission according to claim 2, wherein the shift-time ignition timing controller judges whether or not the input shaft rotation speed has taken an upward tendency following start of the return from the retardation control, and re-starts the retardation control of the ignition timing if it is judged that the input shaft rotation speed has taken an upward tendency.

4. The shift control device of the vehicular automatic transmission according to claim 1, wherein the retardation control start rotation speed is set at a value that is higher than the synchronous rotation speed of the post-second shift gear step.

5. The shift control device of the vehicular automatic transmission according to claim 4, wherein the retardation control start rotation speed is a constant value that is set before the retardation control.

6. The shift control device of the vehicular automatic transmission according to claim 4, wherein the retardation control start rotation speed is calculated on a basis of at least one of an engine rotation speed, the input shaft rotation speed, and an oil temperature of the automatic transmission at the time of the second shift judgment.

7. The shift control device of the vehicular automatic transmission according to claim 2, wherein the shift-time ignition timing controller causes the return from the retardation control on a condition that the input shaft rotation speed goes downward.

8. The shift control device of the vehicular automatic transmission according to claim 2, wherein the shift-time ignition timing controller starts the return from the retardation control when the input shaft rotation speed becomes lower than a rotation speed that is lower than the maximum value by a predetermined value.

* * * * *